(12) United States Patent
Nashner

(10) Patent No.: US 10,220,602 B2
(45) Date of Patent: Mar. 5, 2019

(54) MARKING OF FABRIC CARRYING CASE FOR A PORTABLE ELECTRONIC DEVICE

(71) Applicant: Apple Inc., Cupertino, CA (US)

(72) Inventor: Michael S. Nashner, San Jose, CA (US)

(73) Assignee: Apple Inc., Cupertino, CA (US)

(*) Notice: Subject to any disclaimer, the term of this patent is extended or adjusted under 35 U.S.C. 154(b) by 225 days.

(21) Appl. No.: 15/266,927

(22) Filed: Sep. 15, 2016

(65) Prior Publication Data

US 2017/0001428 A1 Jan. 5, 2017

Related U.S. Application Data

(62) Division of application No. 13/231,830, filed on Sep. 13, 2011, now abandoned.
(Continued)

(51) Int. Cl.
| | | |
|---|---|---|
| *B32B 38/10* | (2006.01) | |
| *B32B 7/12* | (2006.01) | |
| *B32B 27/12* | (2006.01) | |
| *B32B 27/40* | (2006.01) | |
| *B44C 1/22* | (2006.01) | |

(Continued)

(52) U.S. Cl.
CPC .............. *B32B 38/10* (2013.01); *B32B 7/12* (2013.01); *B32B 27/12* (2013.01); *B32B 27/40* (2013.01); *B44C 1/228* (2013.01); *B44C 3/005* (2013.01); *D06H 1/00* (2013.01); *D06Q 1/02* (2013.01); *B32B 2307/402* (2013.01);
(Continued)

(58) Field of Classification Search
CPC ........... B32B 38/10; B32B 7/12; B32B 27/12; B32B 27/40; B44C 1/228; B44C 3/005
See application file for complete search history.

(56) References Cited

U.S. PATENT DOCUMENTS

| 2,346,531 A | 4/1944 | Adachi et al. |
| 2,647,079 A | 7/1953 | Burnham |
(Continued)

FOREIGN PATENT DOCUMENTS

| CN | 1362125 | 8/2002 |
| CN | 1306526 | 3/2007 |
(Continued)

OTHER PUBLICATIONS

Office Action for Taiwanese Patent application No. 101110901, dated Jul. 15, 2015.
(Continued)

*Primary Examiner* — Daniel McNally
(74) *Attorney, Agent, or Firm* — David K. Cole

(57) ABSTRACT

Techniques or processes for providing markings on fabric articles are disclosed. In one embodiment, the articles may be fabric carrying cases for electronic devices. For example, a fabric carrying case for a particular electronic may include a fabric base layer and a plurality of thick films coupled to the fabric base layer, wherein the plurality of thick films may comprise a top thick film and an underlying thick film. Regions of the top thick film may be selectively etched through, for selectively exposing the underlying thick film. The selectively etched regions may be arranged for marking of textual or graphical indicia on the fabric carrying case for the portable electronic device.

19 Claims, 10 Drawing Sheets

Related U.S. Application Data

(60) Provisional application No. 61/469,022, filed on Mar. 29, 2011.

(51) Int. Cl.
*D06H 1/00* (2006.01)
*D06Q 1/02* (2006.01)
*B44C 3/00* (2006.01)
*B41M 5/24* (2006.01)

(52) U.S. Cl.
CPC ............ *B32B 2457/00* (2013.01); *B41M 5/24* (2013.01); *Y10T 428/24331* (2015.01)

(56) References Cited

U.S. PATENT DOCUMENTS

| | | | |
|---|---|---|---|
| 2,812,295 A | 11/1957 | Patrick | |
| 2,989,325 A | 6/1961 | Mullaney | |
| 2,990,304 A | 6/1961 | Cybriwsky et al. | |
| 3,080,270 A | 3/1963 | Fritz | |
| 3,216,866 A | 11/1965 | Orlin | |
| 3,526,694 A | 9/1970 | Lemelson | |
| 3,615,432 A | 10/1971 | Jenkins et al. | |
| 3,645,777 A | 2/1972 | Sierad | |
| RE28,225 E | 11/1974 | Heseltine et al. | |
| 4,247,600 A | 1/1981 | Adachi et al. | |
| 4,269,947 A | 5/1981 | Inata et al. | |
| 4,347,428 A | 8/1982 | Conrad et al. | |
| 4,531,705 A | 7/1985 | Nakagawa et al. | |
| 4,547,649 A | 10/1985 | Butt et al. | |
| 4,564,001 A | 1/1986 | Maeda | |
| 4,651,453 A | 3/1987 | Doyle | |
| 4,686,352 A | 8/1987 | Nawrot et al. | |
| 4,756,771 A | 7/1988 | Brodalla et al. | |
| 4,931,366 A | 6/1990 | Mullaney | |
| 4,993,148 A | 2/1991 | Adachi et al. | |
| 5,215,864 A | 6/1993 | Laakmann | |
| 5,224,197 A | 6/1993 | Zanoni et al. | |
| 5,288,344 A | 2/1994 | Peker et al. | |
| 5,417,905 A | 5/1995 | Lemaire et al. | |
| 5,645,964 A | 7/1997 | Nohr et al. | |
| 5,719,379 A | 2/1998 | Huang et al. | |
| 5,744,270 A | 4/1998 | Pearlman et al. | |
| 5,789,466 A | 8/1998 | Birmingham et al. | |
| 5,808,268 A | 9/1998 | Balz | |
| 5,837,086 A | 11/1998 | Leeb et al. | |
| 5,872,699 A | 2/1999 | Nishii et al. | |
| 5,925,847 A | 7/1999 | Rademacher et al. | |
| 5,943,799 A | 8/1999 | Xu et al. | |
| 6,007,929 A | 12/1999 | Robertson et al. | |
| 6,101,372 A | 8/2000 | Kubo | |
| 6,169,266 B1 * | 1/2001 | Hughes | B41M 5/24 219/121.68 |
| 6,325,868 B1 | 12/2001 | Kim et al. | |
| 6,331,239 B1 | 12/2001 | Shirota et al. | |
| 6,480,397 B1 | 11/2002 | Hsu et al. | |
| 6,540,867 B1 * | 4/2003 | Cochran | B29C 43/003 156/286 |
| 6,574,096 B1 | 6/2003 | Difonzo et al. | |
| 6,590,183 B1 | 7/2003 | Yeo | |
| 6,633,019 B1 | 10/2003 | Gray | |
| 6,746,724 B1 | 6/2004 | Robertson et al. | |
| 6,802,952 B2 | 10/2004 | Hsu et al. | |
| 6,821,305 B2 | 11/2004 | Yan | |
| 6,996,133 B2 | 2/2006 | Krings et al. | |
| 7,065,820 B2 | 6/2006 | Meschter | |
| 7,134,198 B2 | 11/2006 | Nakatani et al. | |
| 7,181,172 B2 | 2/2007 | Sullivan et al. | |
| 7,225,529 B2 | 6/2007 | Wang | |
| 7,284,396 B2 | 10/2007 | Barron et al. | |
| 7,459,373 B2 | 12/2008 | Yoo | |
| 7,508,644 B2 | 3/2009 | Cheung et al. | |
| 7,622,183 B2 | 11/2009 | Shirai et al. | |
| 7,636,974 B2 | 12/2009 | Meschter et al. | |
| 7,691,189 B2 | 4/2010 | En et al. | |
| 8,192,815 B2 | 6/2012 | Weber et al. | |
| 8,367,304 B2 | 2/2013 | Heley et al. | |
| 8,379,678 B2 | 2/2013 | Zhang et al. | |
| 8,379,679 B2 | 2/2013 | Zhang et al. | |
| 3,451,873 A1 | 5/2013 | Zhang | |
| 8,663,806 B2 | 3/2014 | Weber et al. | |
| 8,761,216 B2 | 6/2014 | Zhang | |
| 8,809,733 B2 | 8/2014 | Scott et al. | |
| 8,842,351 B2 | 9/2014 | Lawrence et al. | |
| 8,879,266 B2 | 11/2014 | Jarvis et al. | |
| 8,893,975 B2 | 11/2014 | Sanford et al. | |
| 8,993,921 B2 | 3/2015 | Browning et al. | |
| 9,034,166 B2 | 5/2015 | Tatebe et al. | |
| 9,089,932 B2 | 7/2015 | Lim et al. | |
| 9,132,510 B2 | 9/2015 | Nashner et al. | |
| 9,133,559 B2 | 9/2015 | Silverman | |
| 9,138,826 B2 | 9/2015 | Harrison | |
| 9,173,336 B2 | 10/2015 | Bhatia | |
| 9,185,835 B2 | 11/2015 | Heley et al. | |
| 2001/0030002 A1 | 10/2001 | Zheng et al. | |
| 2002/0058737 A1 | 5/2002 | Nishiwaki et al. | |
| 2002/0097440 A1 | 7/2002 | Paricio et al. | |
| 2002/0109134 A1 | 8/2002 | Iwasaki et al. | |
| 2002/0130441 A1 | 9/2002 | Robinson et al. | |
| 2002/0160145 A1 | 10/2002 | Bauhoff | |
| 2003/0006217 A1 | 1/2003 | Dance | |
| 2003/0024898 A1 | 2/2003 | Natsume et al. | |
| 2003/0074814 A1 | 4/2003 | Krings et al. | |
| 2003/0119469 A1 | 6/2003 | Karr et al. | |
| 2003/0225189 A1 | 12/2003 | Fuller | |
| 2004/0000490 A1 | 1/2004 | Chang | |
| 2005/0023022 A1 | 2/2005 | Kreige et al. | |
| 2005/0034301 A1 | 2/2005 | Wang | |
| 2005/0115840 A1 | 6/2005 | Dolan | |
| 2005/0127123 A1 | 6/2005 | Smithers | |
| 2005/0158576 A1 | 7/2005 | Groll | |
| 2005/0263418 A1 | 12/2005 | Bastus | |
| 2006/0007524 A1 | 1/2006 | Tam | |
| 2006/0055084 A1 | 3/2006 | Yamaguchi et al. | |
| 2006/0066771 A1 | 3/2006 | Hayano et al. | |
| 2006/0225918 A1 | 10/2006 | Chinda et al. | |
| 2007/0018817 A1 | 1/2007 | Marmaropoulos et al. | |
| 2007/0045893 A1 | 3/2007 | Asthana et al. | |
| 2007/0053504 A1 | 3/2007 | Sato et al. | |
| 2007/0262062 A1 | 11/2007 | Guth | |
| 2007/0275263 A1 | 11/2007 | Groll | |
| 2008/0152859 A1 | 6/2008 | Nagal | |
| 2008/0165485 A1 | 7/2008 | Zadesky et al. | |
| 2008/0166007 A1 | 7/2008 | Hankey | |
| 2008/0241478 A1 | 10/2008 | Costin et al. | |
| 2008/0274375 A1 | 11/2008 | Ng et al. | |
| 2008/0295263 A1 * | 12/2008 | Meschter | A43B 23/027 12/146 C |
| 2008/0299408 A1 | 12/2008 | Guo et al. | |
| 2008/0311369 A1 | 12/2008 | Yokoyama et al. | |
| 2008/0311370 A1 | 12/2008 | Yokoyama et al. | |
| 2009/0017242 A1 | 1/2009 | Weber et al. | |
| 2009/0019737 A1 | 1/2009 | Moreno | |
| 2009/0091879 A1 | 4/2009 | Lim | |
| 2009/0104949 A1 | 4/2009 | Sato et al. | |
| 2009/0136723 A1 | 5/2009 | Zhao | |
| 2009/0190290 A1 | 7/2009 | Lynch et al. | |
| 2009/0194444 A1 * | 8/2009 | Jones | A45C 3/00 206/320 |
| 2009/0197116 A1 | 8/2009 | Cheng et al. | |
| 2009/0236143 A1 | 9/2009 | Nakamura | |
| 2009/0260871 A1 | 10/2009 | Weber et al. | |
| 2009/0305168 A1 | 12/2009 | Heley et al. | |
| 2010/0015578 A1 | 1/2010 | Falsafi et al. | |
| 2010/0061039 A1 | 3/2010 | Sanford et al. | |
| 2010/0065313 A1 | 3/2010 | Takeuchi et al. | |
| 2010/0159273 A1 | 6/2010 | Filson et al. | |
| 2010/0159274 A1 | 6/2010 | Filson et al. | |
| 2010/0183869 A1 | 7/2010 | Lin et al. | |
| 2010/0209721 A1 | 8/2010 | Irikura et al. | |
| 2010/0209722 A1 | 8/2010 | Irikura et al. | |
| 2010/0209731 A1 | 8/2010 | Hamano | |
| 2010/0294426 A1 | 11/2010 | Nashner | |

(56) References Cited

U.S. PATENT DOCUMENTS

| | | |
|---|---|---|
| 2010/0300909 A1 | 12/2010 | Hung |
| 2011/0008618 A1 | 1/2011 | Weedlun |
| 2011/0048755 A1 | 3/2011 | Su et al. |
| 2011/0051337 A1 | 3/2011 | Weber et al. |
| 2011/0089039 A1 | 4/2011 | Nashner et al. |
| 2011/0089067 A1 | 4/2011 | Scott et al. |
| 2011/0123737 A1 | 5/2011 | Nashner et al. |
| 2011/0155901 A1 | 6/2011 | Hum et al. |
| 2011/0186455 A1 | 8/2011 | Brodalla et al. |
| 2011/0193928 A1 | 8/2011 | Zhang |
| 2011/0193929 A1 | 8/2011 | Zhang et al. |
| 2011/0194574 A1 | 8/2011 | Zhang et al. |
| 2011/0253411 A1 | 10/2011 | Su et al. |
| 2011/0315667 A1 | 12/2011 | Reichenback et al. |
| 2012/0043306 A1 | 2/2012 | Howerton et al. |
| 2012/0081830 A1 | 4/2012 | Yeates et al. |
| 2012/0100348 A1 | 4/2012 | Brokhyser et al. |
| 2012/0275130 A1 | 11/2012 | Hsu et al. |
| 2012/0275131 A1 | 11/2012 | Hsu et al. |
| 2012/0329246 A1* | 12/2012 | Finn .................. H01L 21/78 438/462 |
| 2013/0075126 A1 | 3/2013 | Nashner et al. |
| 2013/0083500 A1 | 4/2013 | Prest et al. |
| 2013/0129986 A1 | 5/2013 | Heley et al. |
| 2014/0009873 A1 | 1/2014 | Nashner |
| 2014/0134429 A1 | 5/2014 | Weber et al. |
| 2014/0186654 A1 | 7/2014 | Zhang |
| 2014/0363608 A1 | 12/2014 | Russell-Clarke et al. |
| 2014/0367369 A1 | 12/2014 | Nashner et al. |
| 2014/0370325 A1 | 12/2014 | Nashner et al. |
| 2015/0093563 A1 | 4/2015 | Runge et al. |
| 2015/0132541 A1 | 5/2015 | McDonald et al. |

FOREIGN PATENT DOCUMENTS

| | | |
|---|---|---|
| CN | 201044438 | 2/2008 |
| CN | 101204866 | 6/2008 |
| CN | 102173242 | 9/2011 |
| DE | 2456206 | 8/1976 |
| DE | 19523112 | 6/1996 |
| DE | 102005048870 | 4/2007 |
| EP | 0021762 | 1/1981 |
| EP | 0031463 | 7/1981 |
| EP | 0114565 | 8/1984 |
| EP | 121150 | 10/1984 |
| EP | 0234121 | 9/1987 |
| EP | 0633585 | 1/1995 |
| EP | 0997958 | 5/2000 |
| EP | 2399740 | 12/2011 |
| EP | 2488369 | 3/2014 |
| GB | 788329 | 12/1957 |
| JP | 57-149491 | 9/1982 |
| JP | 0313331 | 1/1991 |
| JP | 03138131 | 6/1991 |
| JP | 06-212451 | 8/1994 |
| JP | 06-126192 | 10/1994 |
| JP | 06-320104 | 11/1994 |
| JP | 7-204871 | 8/1995 |
| JP | 2000-000167 | 1/2000 |
| JP | 3-203694 | 8/2001 |
| JP | 2002370457 | 12/2002 |
| JP | 2003055794 | 2/2003 |
| JP | 2005022924 | 1/2005 |
| JP | 2006-138002 | 6/2006 |
| JP | 2008087409 | 4/2008 |
| WO | 98/53451 | 11/1998 |
| WO | 2000077883 | 12/2000 |
| WO | 01/15916 | 3/2001 |
| WO | 2001034408 | 5/2001 |
| WO | 2006/124279 | 11/2006 |
| WO | 2007/088233 | 8/2007 |
| WO | 2008092949 | 8/2008 |
| WO | 2009051218 | 4/2009 |
| WO | 2010095747 | 8/2010 |
| WO | 2010/111798 | 10/2010 |
| WO | 2010135415 | 11/2010 |
| WO | 2011047325 | 4/2011 |

OTHER PUBLICATIONS http://dba.med.sc.edu/price/irf/Adobe_tg_models/cielab.html,published 2000.
Lewis, "Hawley's Condensed Chemical Dictionary", 12th edition, Van Nostrand Reinhold company, New York, 1993. excerpt p. 1075.
Webster's Nine to New Collegiate Dictionary; Merriam-Webster Inc., 1990, excerpt p. 412.
"DP2UV Basic System 2 W", ROBA Technology + Services GmbH, Aug. 2008, 2 pgs.
Notice of Preliminary Rejection for Korean patent Application No. 10-2013-7028049, dated Jul. 29, 2014.
First Office Action for Chinese Patent Application 201200016248.6 dated Sep. 2, 2014.
Bereznai et al., "Surface Modifications Inducded by NS and Sub-PS Examiner Laser Pulses on Titanium Implanted Material", Bio Materials, Elsevier Science Publishers vol. 24, No. 23, Oct. 1, 2003, pp. 4197-4203.
Lopez et al., "Comparison of picosecond and femtosecond laser ablation for surface engraving of metals and semiconductors," Proceedings of Spie, vol. 8243, Feb. 9, 2012, p. 824300.
Rusu et al., "Titanium Alloy Nanosecond vs femtosecond laser marking", Applied Surface Science, vol. 259, Oct. 1, 2012, pp. 311-319.
Shah, Vishu, Handbook of Plastics Testing and Failure Analysis, John Wiely & Sons;, Inc., Third Edition, Jun. 14, 2006.
Final Office Action for Korean Patent Application No. 10-2013-7028049, dated Feb. 17, 2015.
Office Action for Taiwanese Patent Application No. 101110901, dated Jan. 27, 2015.
Hajdu, "Chapter 7", 1990 William Andrew Publishing from www.knovel.com, pp. 193-206.
Annerfors et al., "Nano Molding Technology on Cosmetic Aluminum Parts in Mobile Phones", Division of Prodcution and Materials Engineering, LTH, 2007.
"Thermal Shock Resistant Conformal Coating," Product Data Sheet, Dymax Corporation, Jul. 9, 2007, pp. 1-2.
Marking Lasers: Marking without Limitations, Trumpf Inf., Sep. 10, 207, pp. 1-36.
"UV-Curing Sheet Adhesives", ThreeBond Technical News, Issued Jul. 1, 2009, 8 pages.
Chang, "Lasers Make Other Metals Look Like Gold," New York Times, nytimes.com 2pgs., Jan. 31, 2008.
"Database EPI" Week 201107 Thomas Scientific, London, GB; AN 2010-Q46184, Nov. 17, 2010, 1 pg.
International Search Report for International Patent Application No. PCT/US2012/031269, dated Jul. 6, 2012.
Written Opinion for International Patent Application No. PCT/US2012/031269, dated Jul. 6, 2012.

* cited by examiner

| Laser Model | 20E SHG | 20E THG |
|---|---|---|
| Laser Type | Green-Visible | Ultra-Violet |
| Average Power in Watts | 7 | Less Than About 7 |
| Wavelength in Nanometers | 532 | 355 |
| Pulse Width in Nanoseconds | 25 | 25 |
| Frequency in Kilohertz | 100 | 100 |
| Pulse Energy in milliJoules | 0.07 | 0.07 |
| Peak Power in Kilowatts | 2.8 | 2.8 |
| Spot Diameter (1/e^2) in microns | 30 | 30 |
| Fluence in Joules per square centimeter | 9.9 | 9.9 |
| Irradiance in Gigawatts per square centimeter | 0.4 | 0.4 |
| Line Spacing in microns | 40 | 40 |
| Scan Speed in millimeters per second | 400 | 400 |

FIG. 6

MARKING OF FABRIC CARRYING CASE FOR A PORTABLE ELECTRONIC DEVICE

CROSS-REFERENCE TO RELATED APPLICATION

This application is a division of patent application Ser. No. 13/231,830, filed Sep. 13, 2011, which claims the benefit of provisional patent application No. 61/469,022, filed Mar. 29, 2011, which are hereby incorporated by reference herein in their entireties. This application claims the benefit of and claims priority to patent application Ser. No. 13/231,830, filed Sep. 13, 2011, and provisional patent application No. 61/469,022, filed Mar. 29, 2011.

BACKGROUND OF THE INVENTION

Field of the Invention

The present invention relates to marking products and, more particularly, marking fabric carrying cases for electronic devices.

Description of the Related Art

Embroidery or ink has been used for marking fabric items for many years. For example, it is common for garments to be marked with an owner's initials using embroider or ink. Conventionally, such marking is done with an ink printing or stamping process or with an embroidery process. Although embroidery or conventional ink printing and stamping is useful for many situations, such techniques can be inadequate for marking other items. For example, conventional marking techniques may not be able to offer sufficient accuracy and precision. Thus, there is a need for improved marking techniques.

SUMMARY

The invention pertains to techniques or processes for providing markings on fabric articles. In one embodiment, the articles may be fabric carrying cases for electronic devices. For example, a fabric carrying case for a particular electronic may include a fabric base layer and a plurality of thick films coupled to the fabric base layer, wherein the plurality of thick films may comprise a top thick film and an underlying thick film. Regions of the top thick film may be selectively etched through, for selectively exposing the underlying thick film. The selectively etched regions may be arranged for marking of textual or graphical indicia on the fabric carrying case for the portable electronic device.

The invention can be implemented in numerous ways, including as a method, system, device, or apparatus. Several embodiments of the invention are discussed below.

As an article, one embodiment can, for example, include at least a fabric base layer for the article; a plurality of polymer-based films coupled to the fabric base layer, wherein the plurality of polymer-based films comprise a top film and an underlying film; and selectively etched regions of the top film, which are etched through the top film, for selectively exposing the underlying film through the selectively etched regions of the top film.

As a method for forming and marking an article, one embodiment can, for example, include at least providing a fabric base layer for the article; coupling a plurality of differently colored polymer-based films to the fabric base layer, wherein the plurality of differently colored polymer-based films comprise a top film and an underlying film; and selectively etching regions of the top film through the top film, for selectively exposing the underlying film through the regions of the top film.

As a fabric carrying case for a portable electronic device, one embodiment can, for example, include at least a main body portion having an interior space to hold the electronic device, and an opening into the interior space through which the electronic device can be moved. The main body portion can include at least a fabric base layer, a plurality of polymer-based films coupled to the fabric base layer, wherein the plurality of polymer-based films comprise a top film and an underlying film, and selectively etched regions of the top film, which are etched through the top film, for selectively exposing the underlying film through the selectively etched regions of the top film, wherein the selectively etched regions are arranged for marking of textual or graphical indicia on the fabric carrying case for the portable electronic device.

As an article, another embodiment can, for example, include at least a fabric base layer for the article; a plurality of thick films coupled to the fabric base layer, wherein the plurality of thick films comprise a top film and an underlying film; and selectively etched regions of the top film, which are etched through the top thick film, for selectively exposing the underlying film through the selectively etched regions of the top film.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which:

FIG. 6 is a table illustrating exemplary laser operation parameters according to one embodiment.

DETAILED DESCRIPTION OF EMBODIMENTS OF THE INVENTION

The invention pertains to techniques or processes for providing markings on fabric articles. In one embodiment, the articles may be fabric carrying cases for electronic devices. For example, a fabric carrying case for a particular electronic may include a fabric base layer and a plurality of thick films coupled to the fabric base layer, wherein the plurality of thick films may comprise a top thick film and an underlying thick film. Regions of the top thick film may be selectively etched through, for selectively exposing the underlying thick film. The selectively etched regions may be arranged for marking of textual or graphical indicia on the fabric carrying case for the portable electronic device.

Exemplary embodiments of the invention are discussed below with reference to FIGS. 1A-9. However, those skilled in the art will readily appreciate that the detailed description given herein with respect to these figures is for explanatory purposes as the invention extends beyond these limited embodiments.

Figure 1A:
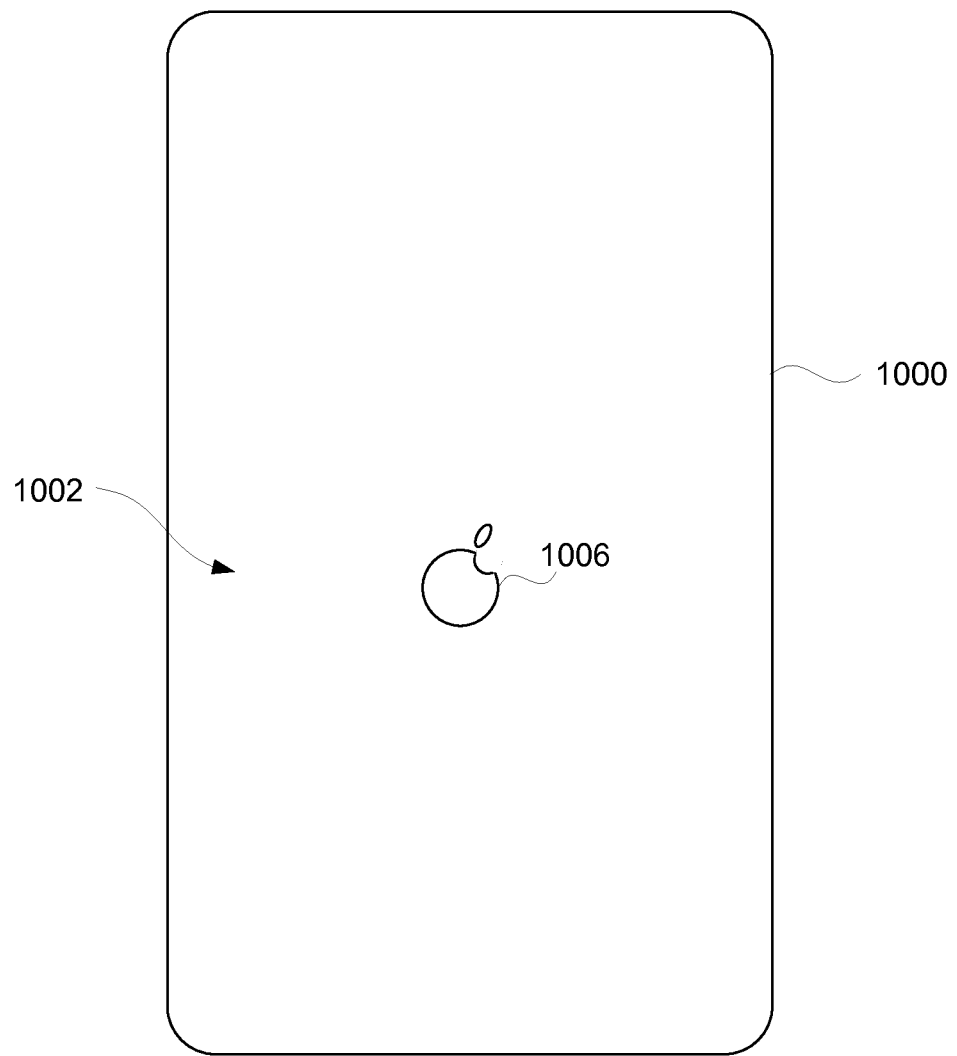
FIGS. 1A-1B show various views of a fabric carrying case for a portable electronic device, wherein the fabric carrying case is marked according to one embodiment.
Figure 1B:
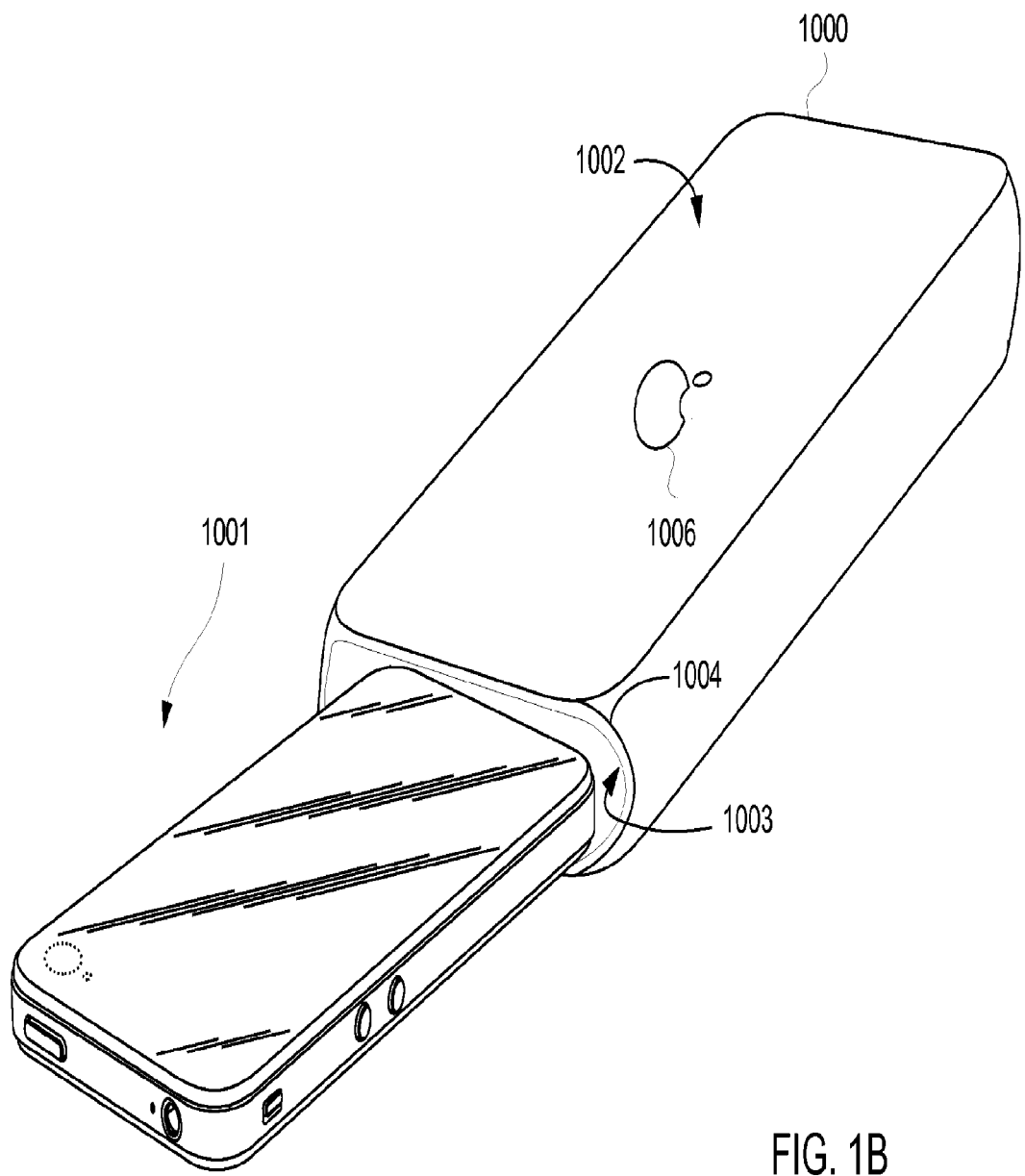

FIGS. 1A-1B show various views of a fabric carrying case 1000 for a portable electronic device 1001, wherein the fabric carrying case is marked according to one embodiment. FIG. 1A shows a top view, wherein the portable electronic device (not shown in FIG. 1A) is disposed within the fabric carrying case 1000.

As particularly shown in perspective view in FIG. 1B, the fabric carrying case may comprise a main body portion 1002 having an interior space 1003 to hold the electronic device 1001, and an opening 1004 into the interior space 1003 through which the electronic device 1001 can be moved. Examples of portable electronic devices include, but are not limited to, mobile telephones (e.g., cell phones), Personal Digital Assistants (PDAs), portable media players, remote controllers, pointing devices (e.g., computer mouse), game controllers, tablet computers, laptop computers, etc.

As discussed in greater detail subsequently herein, the main body portion may comprise a fabric base layer and a plurality of thick films coupled to the fabric base layer. The plurality of thick films may comprise a top thick film and an underlying thick film. Selectively etched regions 1006 of the top thick film may be etched through the top thick film, for exposing the underlying thick film through the selectively etched regions of the top thick film. The selectively etched regions 1006 may be arranged for marking of textual or graphical indicia 1006 on the fabric carrying case 1000 for the portable electronic device 1001.

Figure 2:
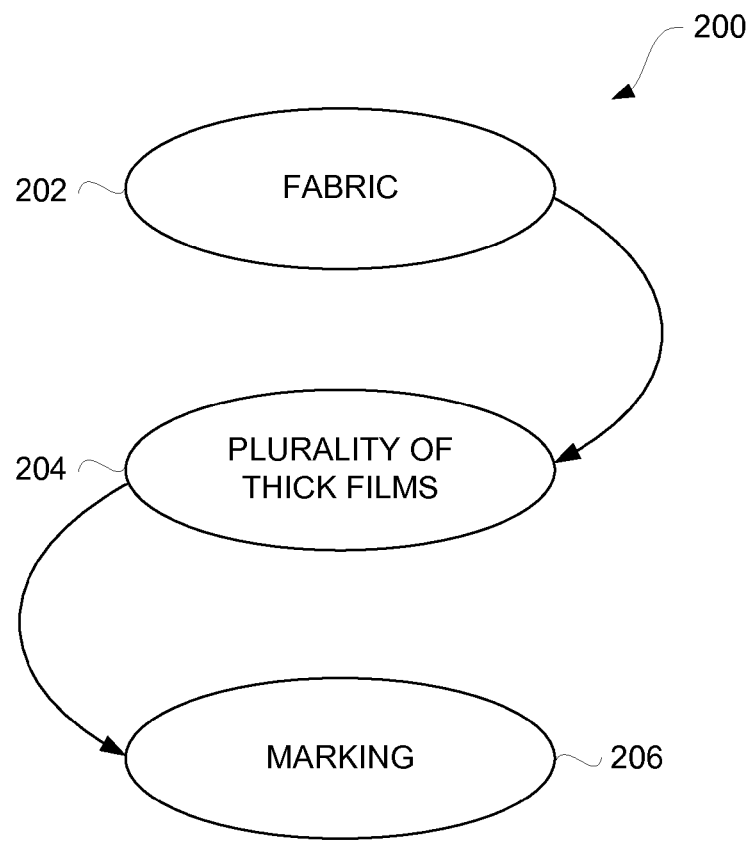
FIG. 2 is a diagram of a marking state machine according to one embodiment.

FIG. 2 is a diagram of a marking state machine 200 according to one embodiment. The marking state machine 200 reflects three (3) basic states associated with marking a fabric article. The marking state machine 200 includes an initial fabric state 202. At the initial fabric state 202, a fabric base layer can be obtained or produced. For example, a knit backing of fibers may be used. The fibers may comprise nylon fibers.

Next, the marking state machine 200 can transition to a state 204 wherein a plurality of thick films may be coupled to the fabric base layer. The fabric base layer may provide strength and/or support for the plurality of thick films. The plurality of thick films may comprise differently colored thick films of substantially the same material. For example, plurality of thick films may comprise differently colored thick films of polyurethane. The plurality of thick films may comprise a top thick film and an underlying thick film.

Next, the marking state machine 200 can transition to a marking state 206. At the marking state 206, marking can be produced on the article to be marked. In particular, a fabric carrying case for a portable electronic device can be marked.

The marking can be provided with high resolution. As will be discussed in greater detail subsequently herein, the article may be marked by employing laser ablation to selectively etch through regions of the top thick film. The underlying thick film may be selectively exposed through selectively etched regions of the top thick film.

The marking can be provided with high contrast. The plurality of thick films may comprise highly contrasting, differently colored thick films. Accordingly, high contrast marking may be provided by the high contrast of the underlying thick film being selectively exposed through selectively etched regions of the top thick film.

Figure 3:
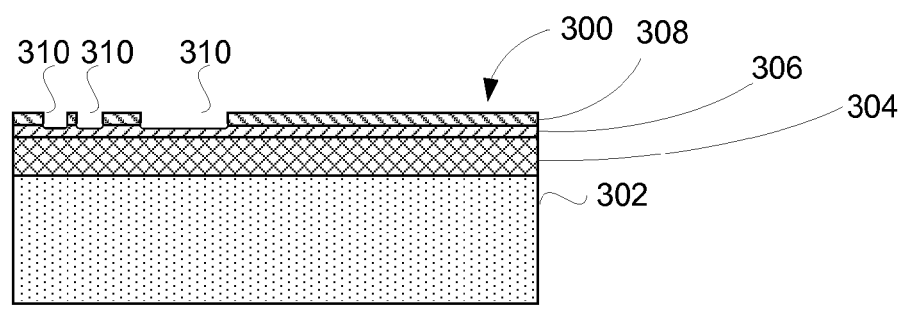
FIG. 3 is a cross sectional view of an article having marking alterations according to one embodiment.

FIG. 3 is a cross sectional view of an article 300 having marking alterations according to one embodiment. Fabric base layer 302 of the article 300 is depicted in the figures using stippling. An adhesive layer 304 may adherently couple a plurality of thick films 306, 308 to the fabric base layer 302. A suitable adhesive may be used for the adhesive layer 304, such as the FINE brand UA series adhesive, or in particular the FINE UA-5900 adhesive. Such adhesives may be available from FINE Chemicals Co., Ltd. having a business address at 68, Haejangseo-ro, Rokjik-jin, Ojung-gu, Soju City, Gangso, China.

In the figures, adhesive layer 304 is depicted using cross hatching. An underlying thick film 306 is depicted using right to left hatching. A top thick film 308 is depicted using left to right hatching. As shown in FIG. 3, the plurality of thick films 306 may be arranged so that a major surface of the top thick film 308 directly contacts a major surface of the underlying thick film 306.

The top thick film 308 may have a thickness dimension of less than approximately fifty microns. The top thick film may have a thickness dimension of about twenty microns. The top thick film may have a thickness dimension of about ten microns. Hence, in one embodiment, the top thickness film may have a thickness within the range of 10-50 microns. However, the thickness is dependent on materials, laser, and laser processing conditions. Similarly, the underlying layer 306 may have a thickness dimension of about twenty microns. The adhesive layer 304 may have a thickness dimension of about thirty microns. However, the thickness of the underlying layer 306 and the adhesive layer 304 can vary with application. For example, the thickness of the underlying layer 306 may be substantially greater than twenty microns, and the adhesive layer 304 may be substantially greater than thirty microns. The base fabric layer may have substantial thickness, which may provide strength and/or support for the plurality of thick films 306, 308.

Each of the plurality of thick films 306, 308 may comprise substantially the same material. For example, each of the plurality of thick films 306, 308 may comprise a plastic. Each of the plurality of thick films 306, 308 may comprise a reaction polymer, or more particularly may comprise a polyurethane. Each of the plurality of thick films 306, 308 may be non-fibrous.

The plurality of thick films 306, 308 may comprise differently colored thick films of substantially the same material. As mentioned previously herein, the differently color thick films may be highly contrasting, so as to provide for high contrast marking of the article 300. A visual appearance of the underlying thick film 306 may be substantially lighter, or may be substantially darker than a visual appearance of the top thick film 308.

As shown in FIG. 3 regions 310 may be selectively etched through the top thick film 308, for selectively exposing the underlying thick film 306 through the selectively etched regions 310 of the top thick film 308. As will be discussed in greater detail subsequently herein, the selectively etched regions 310 of the top thick film 308 may be laser ablated. The selectively etched regions 310 may be arranged for marking of textual or graphical indicia on the article 300. The selectively etched regions 310 may be arranged in a halftone pattern.

Various fabric articles may be marked. The marking is, in one embodiment, particularly well-suited for applying text and/or graphics to a fabric carrying case for a portable electronic device. As noted previously, examples of such portable electronic devices may be mobile telephones (e.g., cell phones), Personal Digital Assistants (PDAs), portable media players, remote controllers, pointing devices (e.g., computer mouse), game controllers, tablet computers, laptop computers, etc.

Figure 4A:
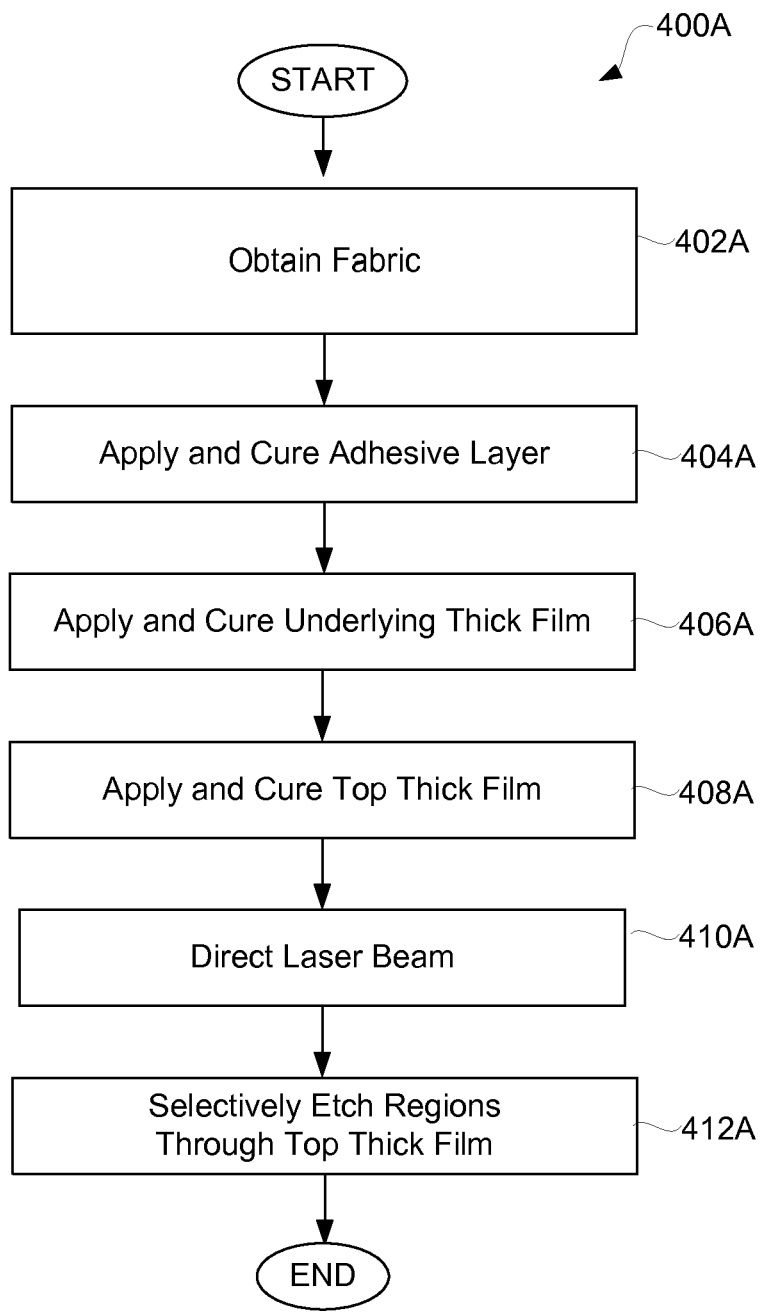
FIG. 4A is a flow diagram of a marking process according to one embodiment.

FIG. 4A is a flow diagram of a marking process 400A according to one embodiment. The marking processes can be performed on a fabric article that is to be marked, and in particular, can be performed on a fabric carrying case that is to be marked. The marking process 400A may be suitable, for example, for applying text or graphics to a fabric carrying case for a portable electronic device. The marking can be provided such that it is visible to users of the fabric carrying case. However, the marking can be placed in various different positions, surfaces or structures of the fabric carrying case.

In accordance with the marking process 400A shown in FIG. 4A, the process may begin with obtaining 402A a fabric base layer for the article. After the fabric base layer has been obtained 402A, an adhesive layer may be applied 404A to the fabric base layer, and may be cured. Accordingly, the adhesive layer may be adherently coupled to the fabric base layer.

After the adhesive layer has been applied and cured, an underlying thick film, for example, an underlying thick film of colored polyurethane, may be applied 406A to the adhesive layer using thick film techniques, and may be cured. After the underlying thick film has been applied and cured, a top thick film, for example, a top thick film of differently colored polyurethane, may be applied 408A to the underlying thick film using thick film techniques, and may be cured. Accordingly, the plurality of differently colored thick films may be adherently coupled to the adhesive layer.

Next a laser beam may be directed 410A to the top thick film. Using laser ablation, regions may be selectively etched 412A through the top thick film, for selectively exposing the underlying thick film through the selectively etched regions of the top thick film. Laser ablating may employ a visible laser, or may employ an ultraviolet laser. Following the block 412A of selectively etching the top thick film, the marking process 400A shown in FIG. 4A can end.

Figure 4B:
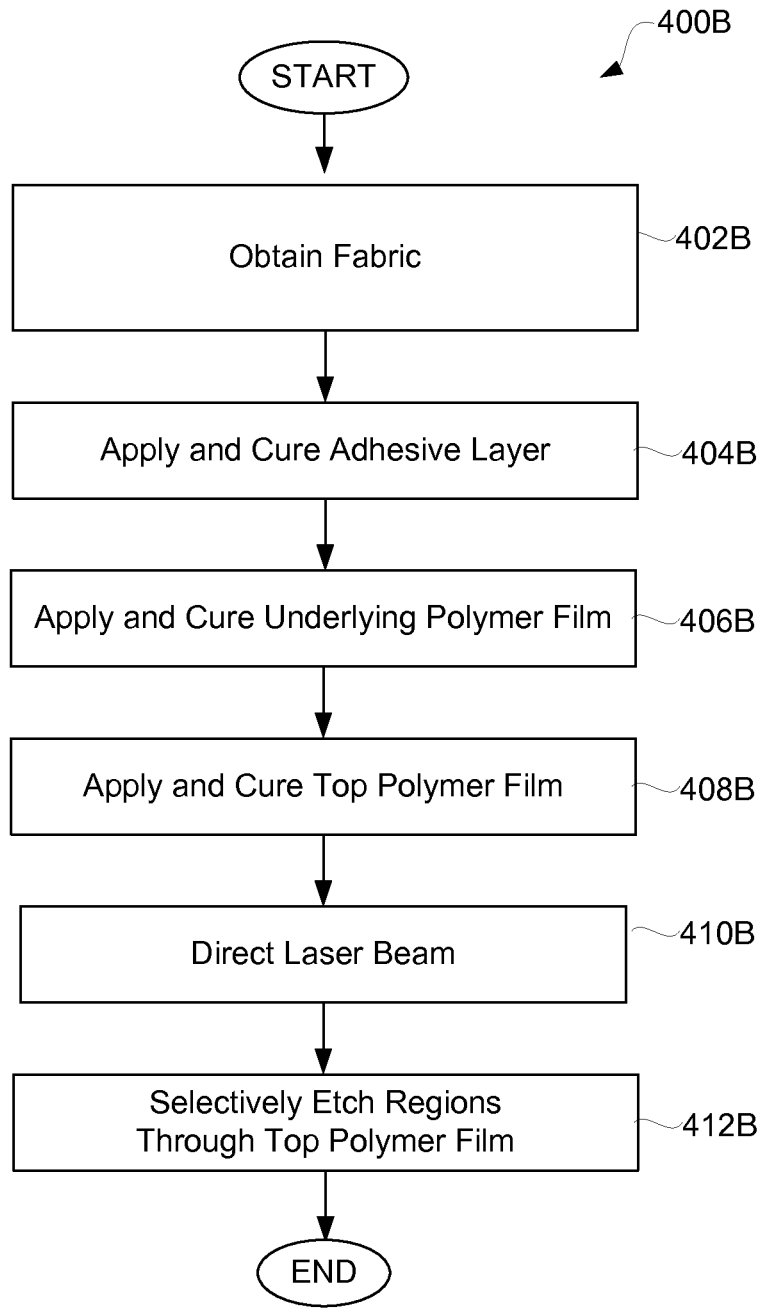
FIG. 4B is another flow diagram of another marking process according to another embodiment.

FIG. 4B is another flow diagram of another marking process according to another embodiment. Similar to the marking process 400A and shown in FIG. 4A as just discussed, the marking processes 400B shown in FIG. 4B can be performed on a fabric article that is to be marked, and in particular, can be performed on a fabric carrying case that is to be marked. The marking process 400B may likewise be suitable, for example, for applying text or graphics to a fabric carrying case for a portable electronic device. The marking can be provided such that it is visible to users of the fabric carrying case. However, the marking can be placed in various different positions, surfaces or structures of the fabric carrying case.

In accordance with the marking process 400B shown in FIG. 4B, the process may begin with obtaining 402B a fabric base layer for the article. After the fabric base layer has been obtained 402B, an adhesive layer may be applied 404B to the fabric base layer, and may be cured. Accordingly, the adhesive layer may be adherently coupled to the fabric base layer.

After the adhesive layer has been applied and cured, an underlying polymer-based film, for example, an underlying thick film of colored polyurethane, may be applied 406B to the adhesive layer using thick film techniques, and may be cured. After the underlying thick film has been applied and cured, a top polymer-based film, for example, a top polymer-based film of differently colored polyurethane, may be applied 408B to the underlying polymer-based film using silk screening, or other thick film techniques, and may be cured. Accordingly, the plurality of differently colored polymer-based films may be adherently coupled to the adhesive layer.

Next a laser beam may be directed 410B to the top polymer-based film. Using laser ablation, regions may be selectively etched 412B through the top polymer-based film, for selectively exposing the underlying polymer-based film through the selectively etched regions of the top polymer-based film. Laser ablating may employ a visible laser, or may employ an ultraviolet laser. Following the block 412B of selectively etching the top polymer-based film, the marking process 400B shown in FIG. 4B can end.

Figure 5A:
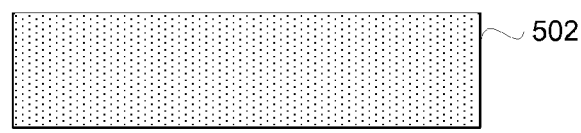
FIGS. 5A-5D are cross sectional diagrams illustrating marking according to one embodiment.

FIGS. 5A-5D are cross sectional diagrams illustrating marking according to one embodiment. Fabric base layer 502 for the article to be marked is shown in FIG. 5A. In the figures, fabric base layer 502 is shown using stippling.

Figure 5B:
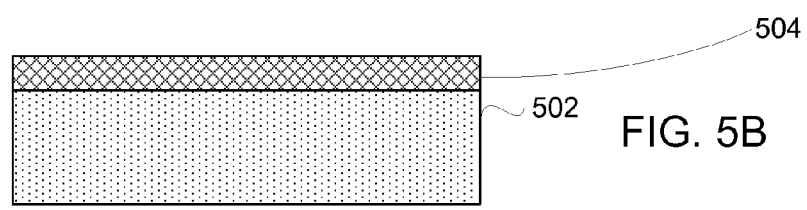

As shown in FIG. 5B, an adhesive layer 504 may be applied to the fabric base layer 502, and may be cured. Accordingly, the adhesive layer 504 may be adherently coupled to the fabric base layer 502. In the figures adhesive layer 504 is shown using cross hatching.

Figure 5C:
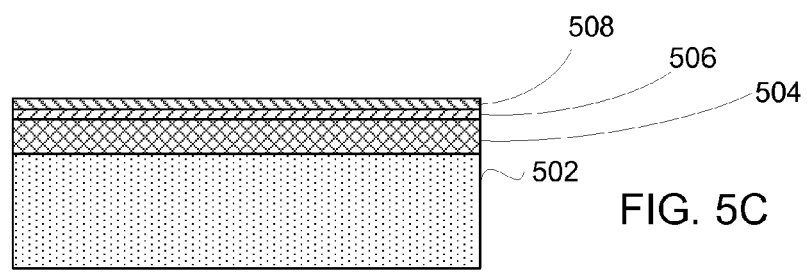

After the adhesive layer 504 has been applied and cured, a plurality of differently colored thick films 506, 508 may be adherently coupled to the adhesive layer 504, as shown in FIG. 5C. An underlying thick film 506, for example, an underlying thick film 506 of colored polyurethane, may be applied to the adhesive layer 504, and may be cured. After the underlying thick film has been applied and cured, a top thick film 508, for example, a top thick film 508 of differently colored polyurethane, may be applied to the underlying thick film 506, and may be cured.

Figure 5D:
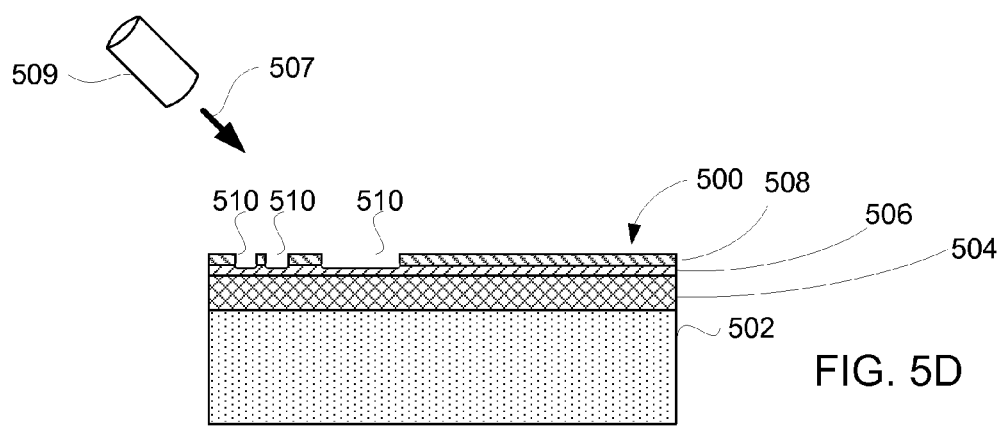

Using laser ablation as shown in FIG. 5D, regions 510 may be selectively etched through the top thick film 508, for selectively exposing the underlying thick film 506 through the selectively etched regions 510 of the top thick film 506. The selectively etched regions 510 may be formed by suitably selected optical energy 507 produced by a suitably selected and operated laser 509. Laser 509 may be a visible laser 509, or may be an ultraviolet laser 509.

The selectively etched regions 510, in aggregation, provide marking of the fabric article 500. The laser 507 may include a galvanometer mirror or other arrangement for raster scanning a spot of the optical energy over the top thick film 508, so as to form selectively etched regions 510 into a rasterized depiction of marking indicia. Suitable pitch between raster scan lines of the scanning spot for the marking may be selected. For example, pitch between raster scan lines may be about forty microns, and scan speed may be about four hundred millimeters per second.

The top thick film 508 may be raster scanned more than once. In particular, in a case where the top thick film 508 may be substantially thicker than approximately twenty microns, additional raster scanning may provide more complete etching of material of such thicker top thick film 508. Whereas the top thick film 508 may be scanned a first time at a first scan speed using scan lines having a first orientation, the top thick film 508 may be scanned a second time at a second scan speed using scan lines having a second orientation. The second scan speed may faster than the first scan speed. The second orientation may be angled at forty-five degrees relative to the first orientation. The second orientation may be angled at ninety degrees relative to the first orientation.

FIG. 6 is a table illustrating exemplary laser operation parameters according to one embodiment. In particular, the table of FIG. 6 shows examples of various suitable laser models which may be used for marking the fabric article. The PowerLine 20E SHG is a Q-switched, frequency doubled Nd:YAG laser (532 nm green-visible wavelength) from Rofin-Sinar Laser GmbH in Bergkirchen. From the same manufacturer, The PowerLine 20E THG is a Q-switched, frequency tripled Nd:YAG laser (355 nm ultra-violet wavelength) It should be understood that the table of FIG. 6 shows approximate exemplary laser operating parameters, and that various other laser operating parameters may be selected to provide the fluence of the optical energy that ablates the top thick film, so as to etch selectively through the top thick film, for selectively exposing the underlying thick film through the selectively etched regions of the top thick film.

Figure 7:
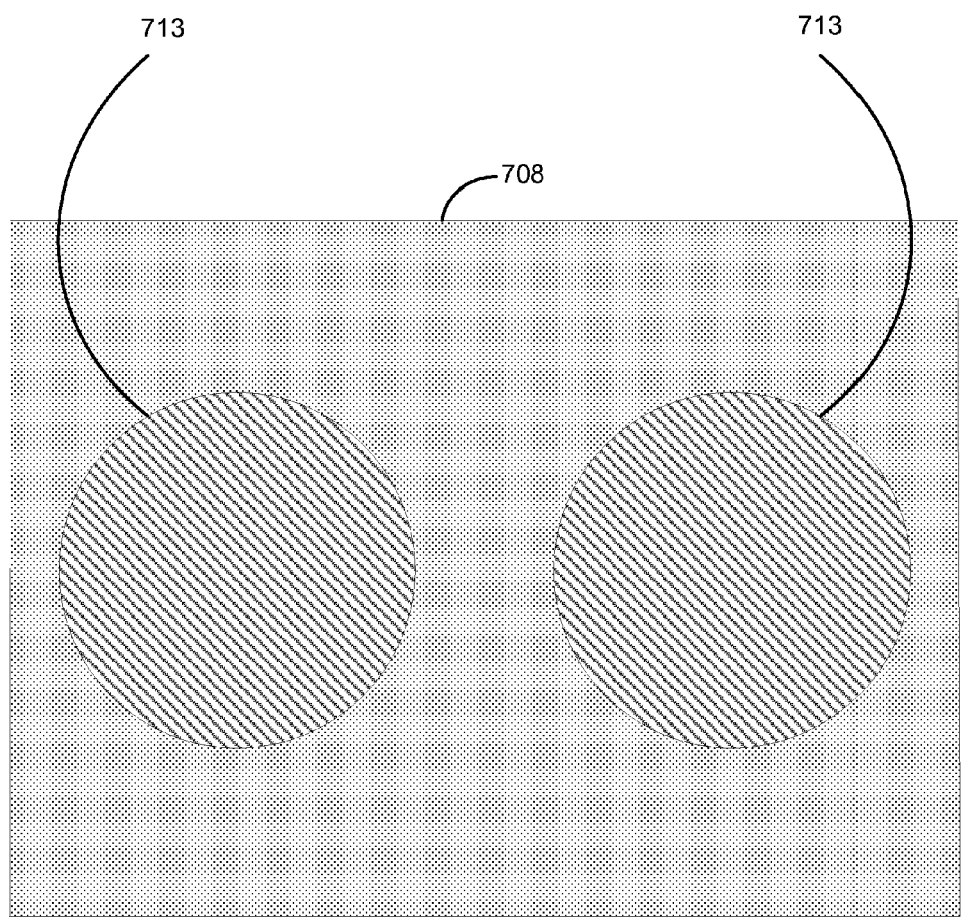
FIG. 7 is a diagram of a magnified top view representative of a lightness halftone pattern for marking according to one embodiment.

FIG. 7 is a diagram of a magnified top view representative of a lightness halftone pattern 713 for marking according to one embodiment. A visual appearance of the underlying thick film may be substantially lighter than a visual appearance of the top thick film 708. FIG. 7 uses left to right hatching to depict the lightness halftone pattern 713, which selectively exposes the lighter visual appearance of the underlying thick film through the selectively etched regions 713 of the top thick film 708. The top thick film 708 is depicted in FIG. 7 using stippling. Size of the selectively etched regions 713 of the top thick film 708, as well as spaced apart arrangement of the selectively etched regions 713 of the top thick film 708 in the lightness halftone pattern 713 may be selected so as to provide a desired lightness halftoning appearance.

Figure 8:
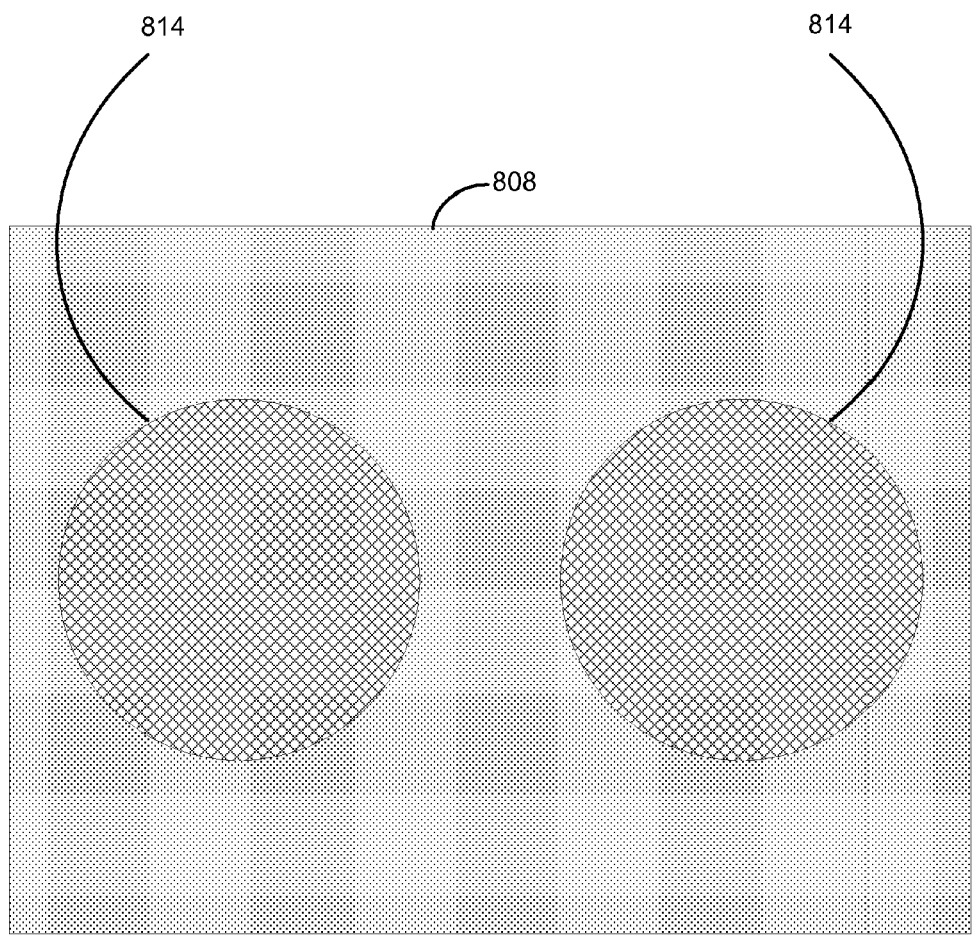
FIG. 8 is a diagram of a magnified top view representative of a darkness halftone pattern for marking according to another embodiment.

FIG. 8 is a diagram of a magnified top view representative of a darkness halftone pattern for marking according to another embodiment. A visual appearance of the underlying thick film may be substantially darker than a visual appearance of the top thick film 808. FIG. 8 uses cross hatching to depict the darkness halftone pattern 813, which selectively exposes the darker visual appearance of the underlying thick film through the selectively etched regions 813 of the top thick film 808. The top thick film 808 is depicted in FIG. 8 using stippling. Size of the selectively etched regions 813 of the top thick film 808, as well as spaced apart arrangement of the selectively etched regions 813 of the top thick film 808 in the darkness halftone pattern 813 may be selected so as to provide a desired darkness halftoning appearance.

Figure 9:
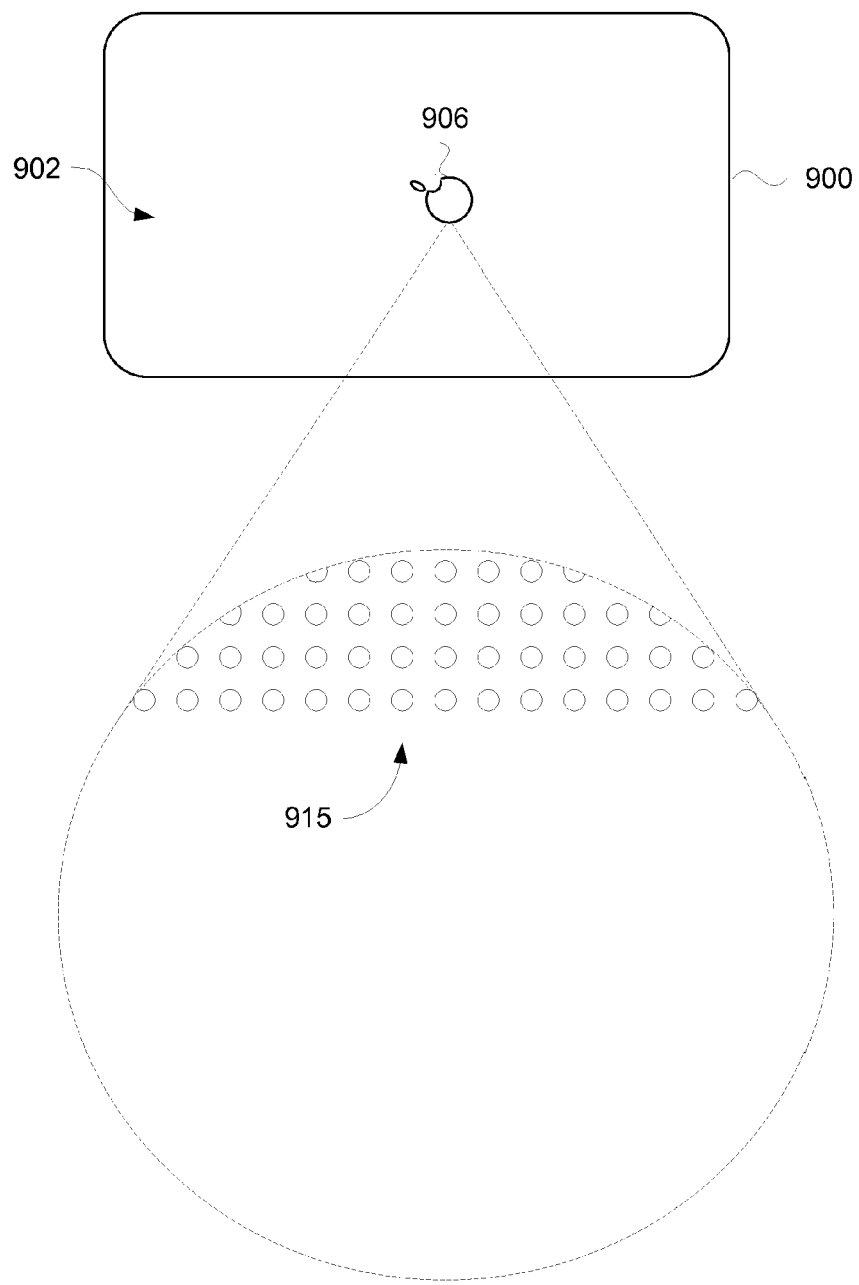
FIG. 9 is a top view of yet another embodiment of the marked fabric case, along with a detail magnified view to show the halftone pattern.

FIG. 9 is a top view of yet another embodiment of the marked fabric case 9000, along with a detail magnified view to show the halftone pattern 9015. As shown in FIG. 9 selectively etched regions 9006 may be arranged for marking of textual or graphical indicia 9006 on main body 9002 of the fabric carrying case 9000. The halftone pattern 9015 may be a lightness halftone pattern as discussed previously herein with reference to FIG. 7, or may be a darkness halftone pattern as discussed previously herein with reference to FIG. 8. Whereas FIGS. 7 and 8 were each greatly simplified to show just two etched dots of the lightness and darkness halftone patterns in magnified view, FIG. 9 shows a somewhat larger number of the etched dots of halftone pattern 9015 in magnified view.

Size of the selectively etched regions of the top thick film, as well as spaced apart arrangement of the selectively etched regions of the top thick film in the halftone pattern 9015 may be selected so as to provide a desired halftoning appearance. For example size of each of the selectively etch regions may be etched dots sized with a diameter of approximately fifty microns or approximately sixty-five microns. Spaced apart arrangement of the selectively etched regions may be an arrangement of the etched dots spaced apart by approximately one-hundred-and-twenty microns.

The marking processes described herein are, for example, suitable for applying text or graphics to a fabric article. The marking processes are, in one embodiment, particularly well-suited for applying text and/or graphics to a fabric carrying case for a portable electronic device. Examples of such portable electronic devices may be mobile telephones (e.g., cell phones), Personal Digital Assistants (PDAs), portable media players, remote controllers, pointing devices (e.g., computer mouse), game controllers, tablet computers, laptop computers, etc.

The portable electronic device can further be a hand-held electronic device. The term hand-held generally means that the electronic device has a form factor that is small enough to be comfortably held in one hand. A hand-held electronic device may be directed at one-handed operation or two-handed operation. In one-handed operation, a single hand is used to both support the device as well as to perform operations with the user interface during use. In two-handed operation, one hand is used to support the device while the other hand performs operations with a user interface during use or alternatively both hands support the device as well as perform operations during use. In some cases, the hand-held electronic device is sized for placement into a pocket of the user. By being pocket-sized, the user does not have to directly carry the device and therefore the device can be taken almost anywhere the user travels (e.g., the user is not limited by carrying a large, bulky and often heavy device).

The various aspects, features, embodiments or implementations of the invention described above can be used alone or in various combinations.

Different aspects, embodiments or implementations may, but need not, yield one or more of the following advantages. One advantage of the invention is that durable, high precision markings can be provided to fabric articles. As an example, the markings may be provided on a fabric carrying case that not only have high resolution and durability but also provide a high quality appearance. Another advantage is that the marking techniques are effective for surfaces that are flat or curved.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for forming and marking a fabric article, the method comprising:
coupling an adhesive layer to a fabric base layer;
after coupling the adhesive layer, curing the adhesive layer;

after curing the adhesive layer, coupling a first polymer-based film to the adhesive layer, wherein the first polymer-based film has a first color;

after coupling the first polymer-based film, curing the first polymer-based film;

after curing the first polymer-based film, coupling a second polymer-based film to the first polymer-based film, wherein the second polymer-based film has a second color that is different than the first color; and etching regions of the second polymer-based film to selectively expose the underlying first polymer-based film through the regions of the second polymer-based film.

2. The method defined in claim 1 wherein selectively etching regions of the second polymer-based film comprises laser ablating regions of the second film.

3. The method defined in claim 2 wherein laser ablating regions of the second polymer-based film comprises laser ablating the regions using a visible laser.

4. The method defined in claim 2 wherein laser ablating regions of the second polymer-based film comprises laser ablating the regions using an ultraviolet laser.

5. The method defined in claim 2 wherein laser ablating regions of the second polymer-based film comprises raster scanning the second film.

6. The method defined in claim 1 wherein selectively etching regions of the second polymer-based film comprises arranging the etched regions of the second film in a halftone pattern.

7. The method defined in claim 1 wherein both the first and the second polymer-based films are non-fibrous.

8. The method defined in claim 1 wherein both the first and the second polymer-based films comprise polyurethane.

9. The method defined in claim 1 wherein the second polymer-based film has a thickness between 10 and 50 microns.

10. The method defined in claim 1 wherein the fabric article is a carrying case for a portable electronic device.

11. The method defined in claim 1 wherein the fabric base layer comprises a knit backing of nylon fibers.

12. A method of forming and marking a fabric case for an electronic device, the method comprising:

coupling an adhesive layer to a fabric base layer;

after coupling the adhesive layer, curing the adhesive layer;

coupling a first film to the adhesive layer;

curing the first film;

after curing the first film, coupling a second film to the first film; and after coupling the second film, etching regions of the second film to selectively expose the underlying first film through the regions of the second film, wherein the etched regions are arranged to form textual or graphical indicia on the fabric case.

13. The method defined in claim 12 wherein the first film and the second film comprise first and second polymer-based films.

14. The method defined in claim 13 wherein the first polymer-based film has a first color and the second polymer-based film has a second color.

15. The method defined in claim 12 wherein etching regions of the second film comprises laser ablating regions of the second film.

16. A method for forming and marking an article from a fabric base layer, the method comprising:

coupling a plurality of films to the fabric base layer with adhesive, wherein the plurality of films includes at least a top film and an underlying film, and wherein the adhesive and the underlying film are cured prior to application of the top film; and after curing the adhesive and the underlying film and applying the top film, removing regions of the top film to expose the underlying film through the regions of the top film.

17. The method defined in claim 16 wherein removing regions of the top film comprises laser ablating regions of the top film.

18. The method defined in claim 17 wherein laser ablating regions of the top film comprises using a visible laser to laser ablate the regions.

19. The method defined in claim 16 wherein the article is a carrying case for a portable electronic device.

* * * * *